(12) United States Patent
Larsson et al.

(10) Patent No.: US 9,701,512 B2
(45) Date of Patent: Jul. 11, 2017

(54) STABILIZING CENTER CORE FOR STABILIZING A COIL OF DUCT OR CABLE

(75) Inventors: Mikael Larsson, Forsa (SE); Torbjörn Nilsson, Hudiksvall (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 601 days.

(21) Appl. No.: 14/345,303

(22) PCT Filed: Sep. 30, 2011

(86) PCT No.: PCT/SE2011/051166
§ 371 (c)(1),
(2), (4) Date: Sep. 26, 2014

(87) PCT Pub. No.: WO2013/048297
PCT Pub. Date: Apr. 4, 2013

(65) Prior Publication Data
US 2015/0076267 A1    Mar. 19, 2015

(51) Int. Cl.
*B65H 75/14* (2006.01)
*B65H 75/22* (2006.01)
(Continued)

(52) U.S. Cl.
CPC ............ *B65H 75/22* (2013.01); *B65H 54/12* (2013.01); *B65H 54/62* (2013.01); *B65H 55/00* (2013.01); *B65H 75/14* (2013.01); *G02B 6/4458* (2013.01); *B65H 2701/5112* (2013.01); *B65H 2701/5132* (2013.01); *B65H 2701/5134* (2013.01)

(58) Field of Classification Search
CPC ................................ B65H 75/14; B65H 75/22
See application file for complete search history.

(56) References Cited

U.S. PATENT DOCUMENTS

| 1,593,781 A | 7/1926 | See |
| 4,180,219 A | 12/1979 | Becker et al. |

(Continued)

FOREIGN PATENT DOCUMENTS

| DE | 87 12 044 | 11/1987 |
| EP | 0 101 134 A1 | 2/1984 |

(Continued)

OTHER PUBLICATIONS

PCT International Search Report for PCT Counterpart Application No. PCT/SE2011/051166, (Jun. 5, 2012), 5 pages.

(Continued)

*Primary Examiner* — Sang Kim
(74) *Attorney, Agent, or Firm* — Patent Portfolio Builders, PLLC

(57) ABSTRACT

The present invention relates to a stabilizing center core for stabilizing a coil of duct or cable. The stabilizing center core comprises a center tube having a first and a second end. A first plate element is arranged at the first end of the center tube, and a second plate element is arranged at the second end of the center tube. The center core further comprises at least three third plate elements extending between the first plate element and the second plate element and arranged at angular distances around a circumference of the center tube, whereby a duct or cable that is wound around the stabilizing center core is supported by the third plate elements.

13 Claims, 4 Drawing Sheets

(51) Int. Cl.
*B65H 54/12* (2006.01)
*B65H 55/00* (2006.01)
*G02B 6/44* (2006.01)
*B65H 54/62* (2006.01)

(56) References Cited

U.S. PATENT DOCUMENTS

| | | | |
|---|---|---|---|
| 4,221,347 A * | 9/1980 | Hill | B65H 75/22 |
| | | | 242/573.6 |
| 4,270,710 A | 6/1981 | Ono | |
| 5,954,294 A | 9/1999 | Forsner et al. | |
| 6,206,323 B1 * | 3/2001 | Byars | B65H 54/543 |
| | | | 242/127 |
| 6,345,781 B1 | 2/2002 | Bowers | |
| 2009/0152390 A1 * | 6/2009 | Underbrink | B65H 49/24 |
| | | | 242/432.6 |

FOREIGN PATENT DOCUMENTS

| | | |
|---|---|---|
| FR | 2 715 147 A3 | 7/1995 |
| JP | S52 13686 A | 2/1977 |
| JP | S59 74858 A | 4/1984 |
| WO | WO-02/34647 A1 | 5/2002 |
| WO | WO-2004/014772 | 2/2004 |

OTHER PUBLICATIONS

PCT Written Opinion of the International Searching Authority for PCT Counterpart Application No. PCT/SE2011/051166, (Jun. 5, 2012), 4 pages.

European Search Report for International Application No. PCT/SE2011/051166, mailed Mar. 27, 2015, 7 pages.

* cited by examiner

STABILIZING CENTER CORE FOR STABILIZING A COIL OF DUCT OR CABLE

CROSS-REFERENCE TO RELATED APPLICATIONS

This application is a National stage of International Application No. PCT/SE2011/051166, filed Sep. 30, 2011, which is hereby incorporated by reference.

TECHNICAL FIELD

The present invention relates to an arrangement and a method for stabilizing a coil of duct or cable

BACKGROUND

Microducts are small ducts for the installation of fibre optic cables. They have a size ranging from typically 3 to 16 mm and are installed as bundles in ducts. The installation of fibre optic cables in ducts can be done by pulling or by cable jetting. Cable jetting is the process of blowing the fibre optic cable through the microduct. Ducts are sensitive to impacts and bending since this may harm the microduct inside the ducts. If the microducts inside the duct are harmed it may be impossible to blow the fibre optic cables through the microducts.

Ducts or cables for telecommunication use or power distribution are normally shipped on cable drums alternatively without drums, wrapped in coils. In many situations, it is advantageous to deliver ducts or cables in coils since the volume and weight of the product is significantly smaller. Cost for shipping will therefore be dramatically reduced, especially for overseas deliveries. In addition, customers may prefer coils since there is no need for waste handling of used cable drums. Cost for handling and installation for the customer will then be reduced. There are a lot to gain by using coils; however there are several fundamental problems associated to coiling of ducts or cables. Coiling of ducts or cables requires special and expensive machines not available at many duct or cable manufacturing plants. Many manufacturing plants are built around an infrastructure that handles reels only. Ducts are heavy and handling of coils of these products is a problem due to their own weight. To optimize shipping, coils are stacked upon each other, preferably up to 4 coils. The weight of the upper coils may squeeze the ducts or cables in the lower coils. Stacked coils may also slip during transportation and it is not easy to stabilize stacked coils.

There is therefore a need for an improved solution for handling coils of ducts or cable, which solution solves or at least mitigates at least one of the above mentioned problems.

SUMMARY

An object of the present invention is therefore to provide an arrangement and a method which solve or at least mitigate at least one of the above mentioned problems.

In accordance with a first aspect the present invention relates to a stabilizing centre core for stabilizing a coil of duct or cable. The stabilizing centre core comprises a centre tube having a first and a second end. A first plate element is arranged at the first end of the centre tube, and a second plate element is arranged at the second end of the centre tube. The centre core further comprises at least three third plate elements extending between the first plate element and the second plate element and arranged at angular distances around a circumference of the centre tube, whereby a duct or cable that is wound around the stabilizing centre core is supported by the third plate elements.

The above stated object is thus achieved by means of a stabilizing centre core made a center tube, a first plate element, a second plate element and at least three third plate elements extending between the first plate element and the second plate element and arranged at angular distances around a circumference of the centre tube.

An advantage of embodiments of the present invention is that it provides a significant lighter construction than a traditional reel.

A further advantage of embodiments of the present invention is that the stabilizing centre core is easier to assemble and disassemble than a traditional reel.

Another advantage of embodiments of the present invention is that the stabilizing centre core also supports stacking of several stabilizing centre cores above each other without the duct or cable that is wound around the stabilizing centre core is harmed. The stabilizing centre core relieves pressure loads on the duct or cable when several coils are stacked on each other, minimizing risk for damaged ducts or cables during transport.

A further advantage of embodiments of the present invention is that duct or cable can be wound up on the stabilizing centre core using the same equipment used for winding up duct or cable on traditional reels.

Yet a further advantage of embodiments of the present invention is that the design also supports mounting of lifting straps so that the stabilizing centre core can be lifted with e.g. a forklift or a crane.

Another advantage with embodiments of the present invention is that the stabilizing centre core can be used with traditional drum winding machines when the duct or cable is installed; hence no costly investments for coiling machines are necessary.

Further features of embodiments of the present invention will become apparent when reading the following detailed description in conjunction with the drawings.

DETAILED DESCRIPTION

Figure 1:
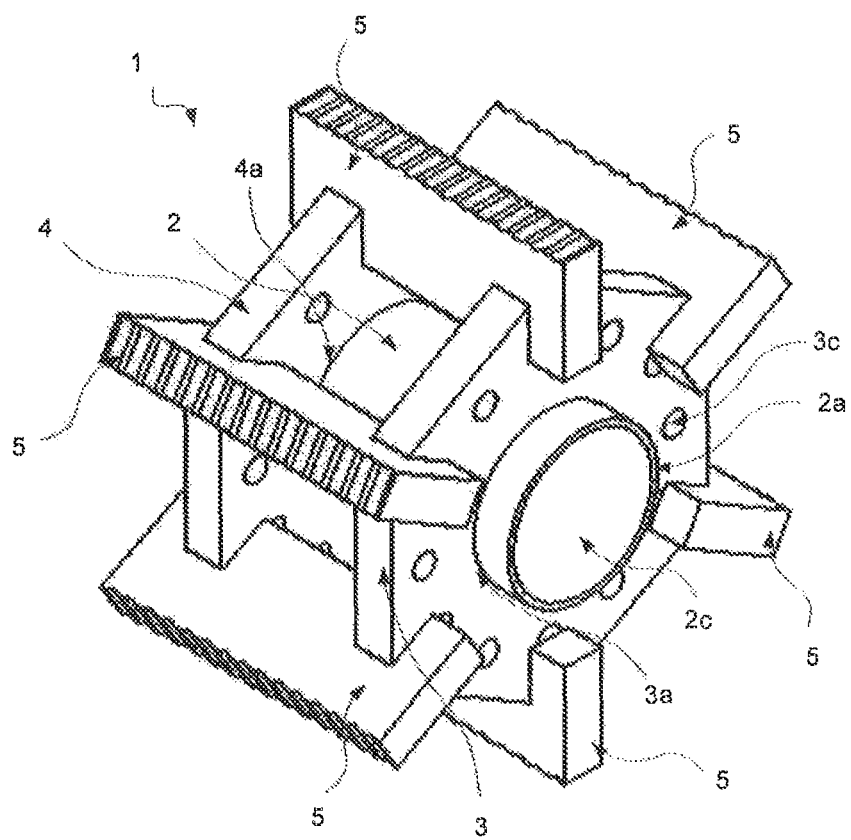
FIG. 1 shows an exemplary embodiment of the present invention.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 shows a stabilizing centre core 1 for stabilizing a coil of duct or cable, according to an exemplary embodiment of the present invention. As illustrated, the stabilizing centre core 1 comprises a centre tube 2 having a first 2a and a second end 2b. The centre tube 1 comprises a central opening 2c so that the stabilizing centre core 1 can be mounted on a machine (not shown) for winding up duct or cable on the stabilizing centre core 1. The hole is also used for mounting the stabilizing center core 1 on a pay off equipment (not shown) which is used when the duct or cable on the stabilizing centre core 1 is installed. The stabilizing centre core 1 further comprises a first plate element 3 arranged at the first end 2a of the centre tube 2 and a second plate element 4 arranged at the second end 2b of the centre tube 2. In an exemplary embodiment of the stabilizing centre core 1 according to the present invention is the first and the second plate elements 3, 4 hexagonal as illustrated in FIG. 1. The first and second plate elements 3, 4 may however in other exemplary embodiments have other shapes. In the exemplary embodiment of the stabilizing centre core 1 illustrated in FIG. 1 the first plate element 3 and the second plate element 4 each comprise a central opening 3a, 4a of a dimension that corresponds to the dimension of the central tube 2. The first and the second plate elements 3, 4 are thereby adapted to be thread on the centre tube 2 and can easily be removed there from. The stabilizing centre core 1 further comprises at least three third plate elements 5 extending between the first plate element 3 and the second plate element 4 and arranged at angular distances around a circumference of the centre tube 2. The duct or cable that is wound around the stabilizing centre core 1 is thereby supported by the third plate elements 5, which prevents the duct or cable from being bent and thereby from being harmed.

In other exemplary embodiment of the stabilizing centre core 1 according to the present invention the stabilizing center core 1 comprising at least four third plate elements 5 at a maximum angular distance of 90 degrees. In yet other exemplary embodiment of the stabilizing center core 1 according to the present invention the stabilizing centre core 1 comprises at least six evenly distributed third plate elements 5. Having more third plate elements 5 in the stabilizing centre core 1 results in that the duct or cable that is would around the stabilizing centre core 1 is given more support. As mention above ducts are sensitive to impacts and bending since this may harm the microducts inside the ducts. If the microducts inside the duct are harmed it may be impossible to blow the fiber optic cable through the microduct. It is therefore important that the duct is given enough support by the third plate elements 5 when the duct is wound around stabilizing centre core 1. Depending of the size of the duct and the stabilizing centre core 1 different number of third plate elements 5 is required in order to give enough support to the duct in order to prevent the duct from being harmed. Using fewer third plate elements 5 makes the stabilizing centre core faster to assemble and disassemble. Yet an advantage with fever third plate elements 5 is lower cost and weight.

In another exemplary embodiment of the stabilizing centre core 1 according to the present invention 1 the at least three third plate elements 5 are detachably mounted on the first plate element 3 and the second plate element 4, whereby the at least three third plate elements 5 easily can be removed from the first plate element 3 and the second plate element 4.

In another exemplary embodiment of the stabilizing centre core 1 according to the present invention 1 surfaces on the third plate elements 5 which support the duct or cable have been treated in order to increase the friction against the duct or cable. The third plate elements 5 may for instance comprise furrows or grooves which increase the friction between the duct or cable and the third plate elements 5. An advantage with increasing the friction between the duct or cable and the third plate elements is that the duct or cable is further prevented from slipping on the stabilizing centre core 1 during handling or transportation. In yet another exemplary embodiment of the stabilizing centre core 1 according to the present invention at least one of the centre tube 2, the first plate element 3, the second plate element 4 and the third plate elements 5 are made of a material that is substantially lighter than wood, for example cardboard, which is also recyclable.

Traditional reels are made of structural timer which is a heavy type of tree. In this exemplary embodiment the weight of the stabilizing center core 1 is further reduced which makes the handling of the stabilizing centre core 1 even easier. Transportation costs for shipping the duct or cable wound up on the stabilizing centre core 1 is then also further reduced. Other advantages with using cardboard for at least one of the components 2, 3, 4, 5 is that the cost for the stabilizing centre core 1 is further reduced and the that it is easier to recycle the stabilizing centre core with minimum waste management compared to a complete cable reel.

In another exemplary embodiment of the stabilizing centre core 1 according to the present invention 1 the centre tube 2, the first plate element 3, the second plate element 4 and the third plate elements 5 are made of a plastic, wood, Styrofoam or metall.

Figure 2:
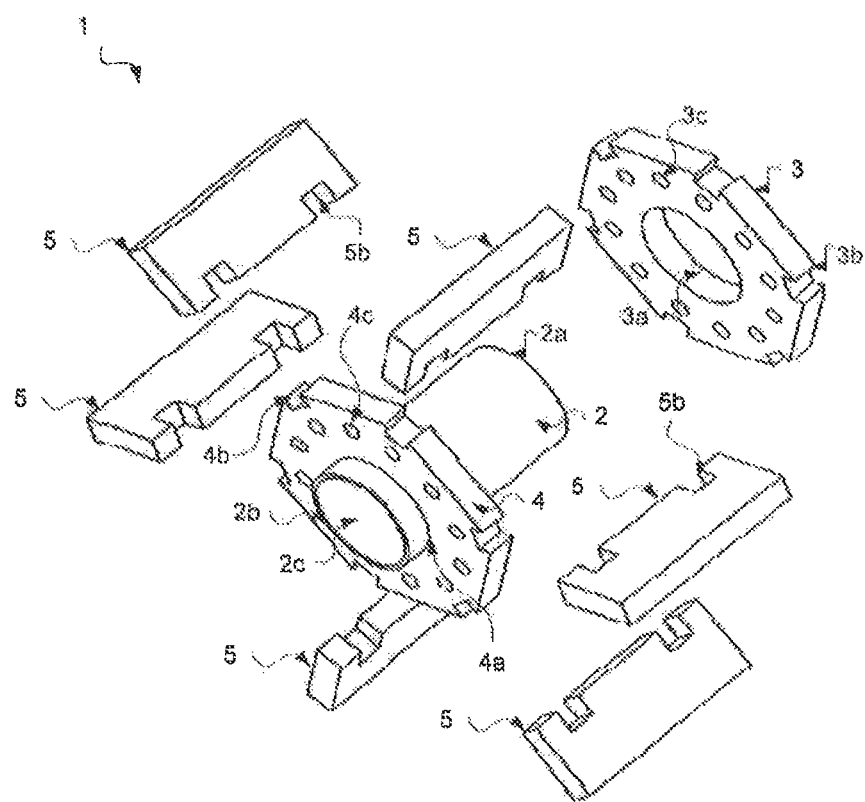
FIG. 2 shows an exploded diagram of an exemplary embodiment of the present invention.

Referring FIG. 2, the first and second plate elements 3, 4 comprise notches 3b, 4b adapted to receive and hold the third plate elements 5. In another exemplary embodiments the third plate elements 5 also comprises notched adapted to receive and hold the first and second plate elements 3, 4. In the exemplary embodiment of the stabilizing centre core 1 in FIGS. 1 and 2 the components 2, 3, 4, 5 are assembled in a form-fit manner, allowing all components to be easily disassembled.

In the exemplary embodiment of the stabilizing centre core 1 illustrated in FIG. 1 are all components 2, 3, 4, 5 of the stabilizing centre core 1 arranged radially inside a duct, or cable which is wound around the stabilizing centre core 1.

In the exemplary embodiments of the stabilizing centre core 1 illustrated in FIGS. 1 and 2 the duct centre core components 2, 3, 4, 5 are assembled in a form-fit manner, allowing all components to be easily disassembled. Therefore neither glue, nails nor screws are required in order to hold the components 2, 3, 4, 5 together, simply notches 3b, 4b, 5b that are dimensioned so that a component can be held by friction. In the exemplary embodiments of the stabilizing centre core 1 illustrated in FIGS. 1 and 2 the first and second plate elements 3, 4 comprise a plurality of openings 3c, 4c arranged between the central opening 3a, 4a and the outer circumferential edge of the plate elements 3, 4. Theses openings 3c, 4c may be used for a securing element (not shown) which is arranged to secure the wound of duct or cable on the stabilizing centre core 1. In an exemplary embodiment of the stabilizing centre core 1 according to the present invention the openings 3c, 4c are placed between the centre tube 2 and the third plate elements 5. An advantage of placing the openings 3c, 4c at this position is that the bearing stresses at the openings 3c, 4c caused by the a securing element is reduced.

In an exemplary embodiment of the stabilizing centre core 1 illustrated in FIG. 1 and FIG. 2 area diameter of the centre tube 2 between 300-1500 mm, an outer diameter of stabilizing center core 2 between 500-2400 mm and a height of the stabilizing center core 2 between 300-2000 mm.

Figure 3:
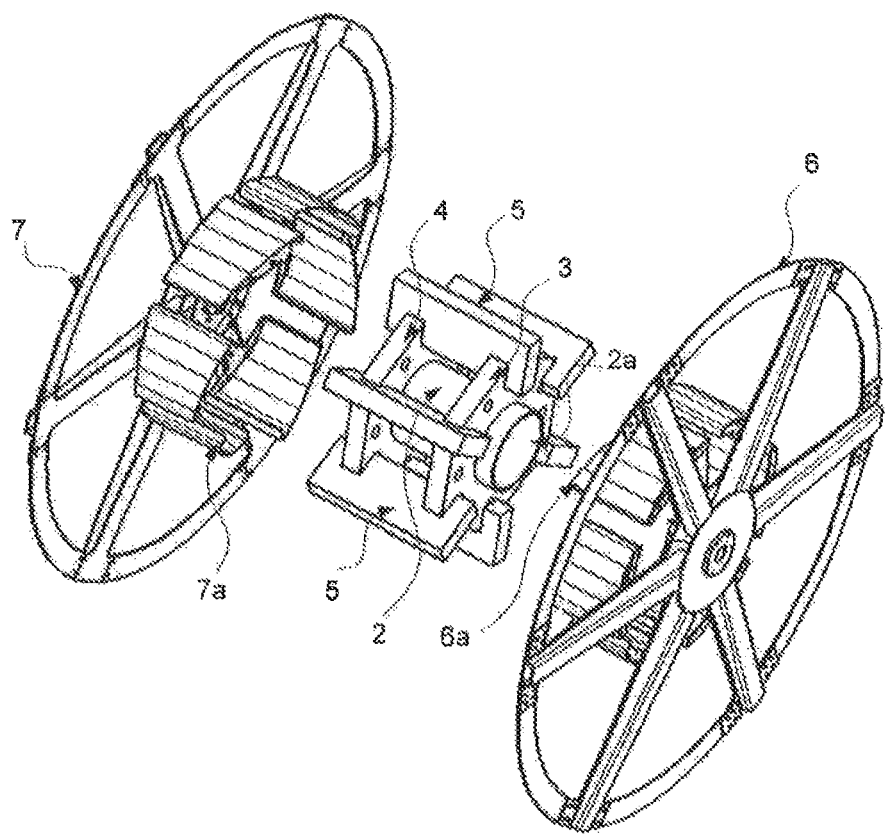
FIG. 3 illustrates components that are used in a method for winding up duct or cable according to an embodiment of the present invention.

FIG. 3 illustrates a first gable element 6, a second gable element 7 and supporting elements 6a, 7a that are used in a method for winding up a duct or cable on a stabilizing centre core 1 according to the present invention. The first gable element 6 is arranged at the first end 2a of the centre tube 2 and the second gable element 7 is arranged at the second end 2b of the centre tube 2. Supporting elements 6a, 7a carried by the first and/or second gable elements 6, 7, are arranged between two circumferentially neighboring third plate elements 5.

Figure 4:
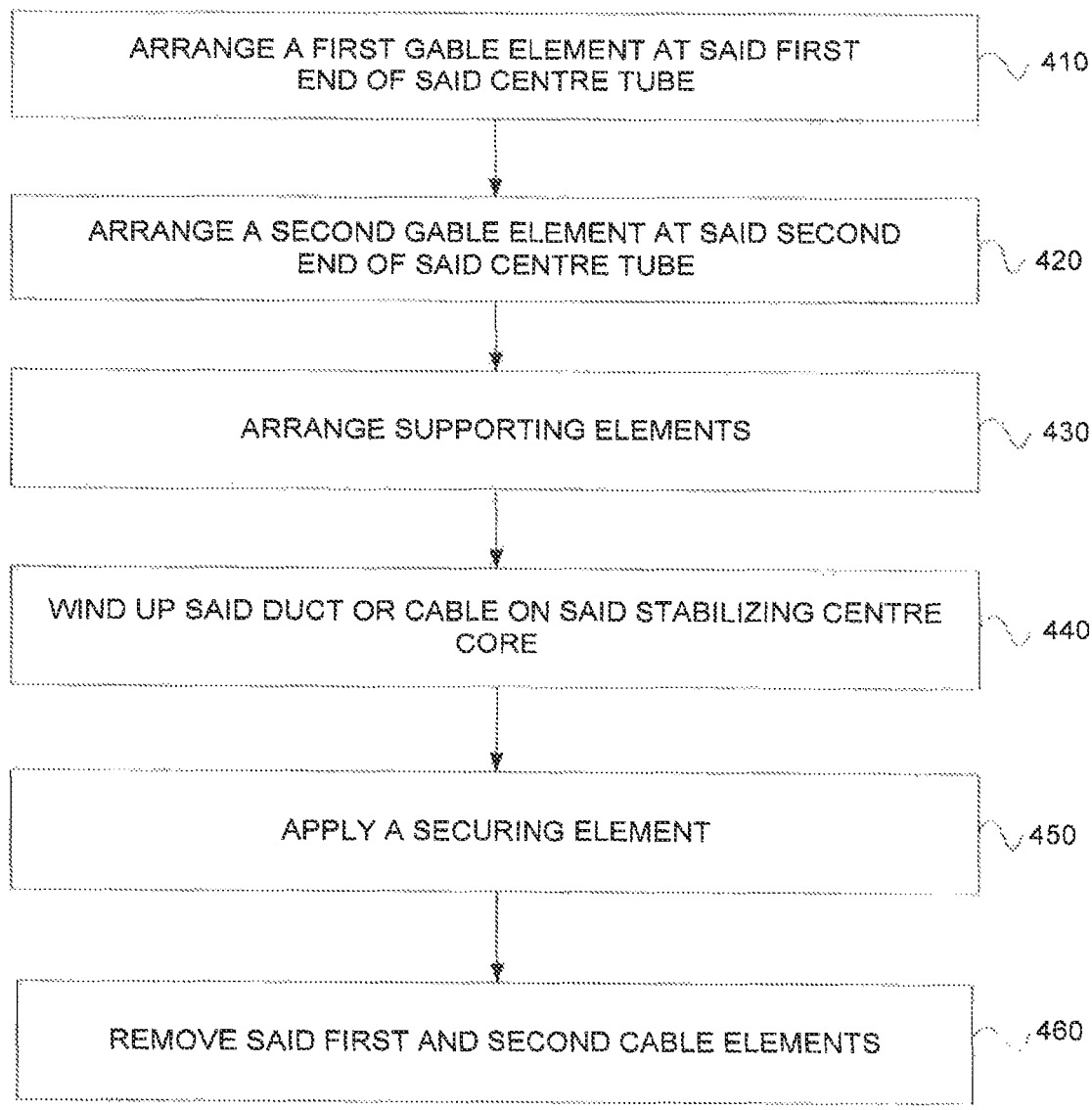
FIG. 4 shows a flowchart of a method for winding up a duct or cable according to an embodiment of the present invention.

FIG. 4 shows a flowchart of the method for winding up a duct or cable on the stabilizing centre core 1 according to the present invention. In a step 410 the first gable element 6 is arranged at the first end 2a of the centre tube 2. Next in a step 420 is the second gable element 7 arranged at the second end 2b of the centre tube 2. Thereafter in a step 430 are the supporting elements 6a, 7a carried by the first and/or second gable elements 6, 7, arranged between two circumferentially neighboring third plate elements 5. In a step 440 is then the duct or cable wound up on the stabilizing centre core 1, whereby the duct or cable is at least partly supported by the first and second supporting elements 6a, 7a. Further, in a step 450 is a securing element, which is arranged to secure the wound of duct or cable on the stabilizing centre core 1 applied.

In a final step 460 is the first and second gable elements 6, 7 are removed whereby the duct or cable is supported by the third plate elements 5. In another exemplary embodiment of the method illustrated in FIG. 4 the first and second supporting elements 6a, 7a are elastic, whereby the first and second gable elements 6, 7 more easily can be removed from the stabilizing centre core 1.

The present invention further relates to a duct or cable package unit, comprising a stabilizing centre core 1 according to any exemplary embodiments, an elongated duct or cable that is wound around the stabilizing centre core 1, and a securing element, which is arranged to secure the wound duct or cable on the stabilizing centre core 1.

The invention claimed is:

1. A stabilizing center core for stabilizing a coil of duct or cable, said stabilizing center core comprising:
    a center tube having a first end and a second end;
    a first plate element arranged at said first end of said center tube; and
    a second plate element arranged at said second end of said center tube;
        wherein said stabilizing center core further comprises:
            at least three third plate elements extending between said first plate element and said second plate element and arranged at angular distances around a circumference of said center tube, wherein said third plate elements are configured to support a duct or cable wound around said stabilizing center core, and
        wherein said center tube, said first plate element, said second plate element, and said third plate elements are detachably assembled in a form-fit manner.

2. The stabilizing center core according to claim 1, wherein said first plate element and said second plate element each comprise a central opening of a dimension that corresponds to said dimension of said center tube, and said first plate element and second plate element are adapted to be detachably thread on said center tube.

3. The stabilizing center core according to claim 1, wherein said at least three third plate elements are mounted on said first plate element and said second plate element.

4. The stabilizing center core according to claim 1, wherein at least one of said center tube, said first plate element, said second plate element and said third plate elements are made of a material that is substantially lighter than wood.

5. The stabilizing center core according to claim 1, wherein said center tube, said first plate element, said second plate element and said at least three third plate elements are made from the group consisting of plastic, cardboard, wood, styrofoam and metal.

6. The stabilizing center core according to claim 1, comprising at least four third plate elements at a maximum angular distance of 90 degrees.

7. The stabilizing center core according to claim 1, comprising at least six evenly distributed third plate elements.

8. The stabilizing center core according to claim 1, wherein said center tube, said first plate element, said second plate element and said at least three third plate elements are made of cardboard.

9. The stabilizing center core according to claim 1, wherein said center tube, said first plate element, said second plate element and said at least three third plate elements are made of plastic, wood, Styrofoam or metal.

10. The stabilizing center core according to claim 1, wherein said first plate element and said second plate element comprise notches adapted to receive and hold said third plate elements.

11. The stabilizing center core according to claim 1, wherein said third plate elements comprise notches adapted to receive and hold said first plate element and second plate element.

12. The stabilizing center core according to claim 1, configured such that all components of said stabilizing center core are arranged radially inside a duct, which is wound around said stabilizing center core.

13. A duct or cable package unit, comprising:
    a stabilizing center core comprising:
        a center tube having a first end and a second end;
        a first plate element arranged at said first end of said center tube; and
        a second plate element arranged at said second end of said center tube;
    wherein said stabilizing center core further comprises at least three third plate elements extending between said first plate element, and said second plate element and arranged at angular distances around a circumference of said center tube, wherein said third plate elements configured to support a duct or cable wound around said stabilizing center core; and
        an elongated duct or cable that is wound around said stabilizing center core,
        wherein said center tube, said first plate element, said second plate element, and said third plate elements are detachably assembled in a form-fit manner.

* * * * *